May 22, 1951 — S. ALEXANDER — 2,554,437
ENGINE OIL-COOLING MEANS
Filed March 31, 1947
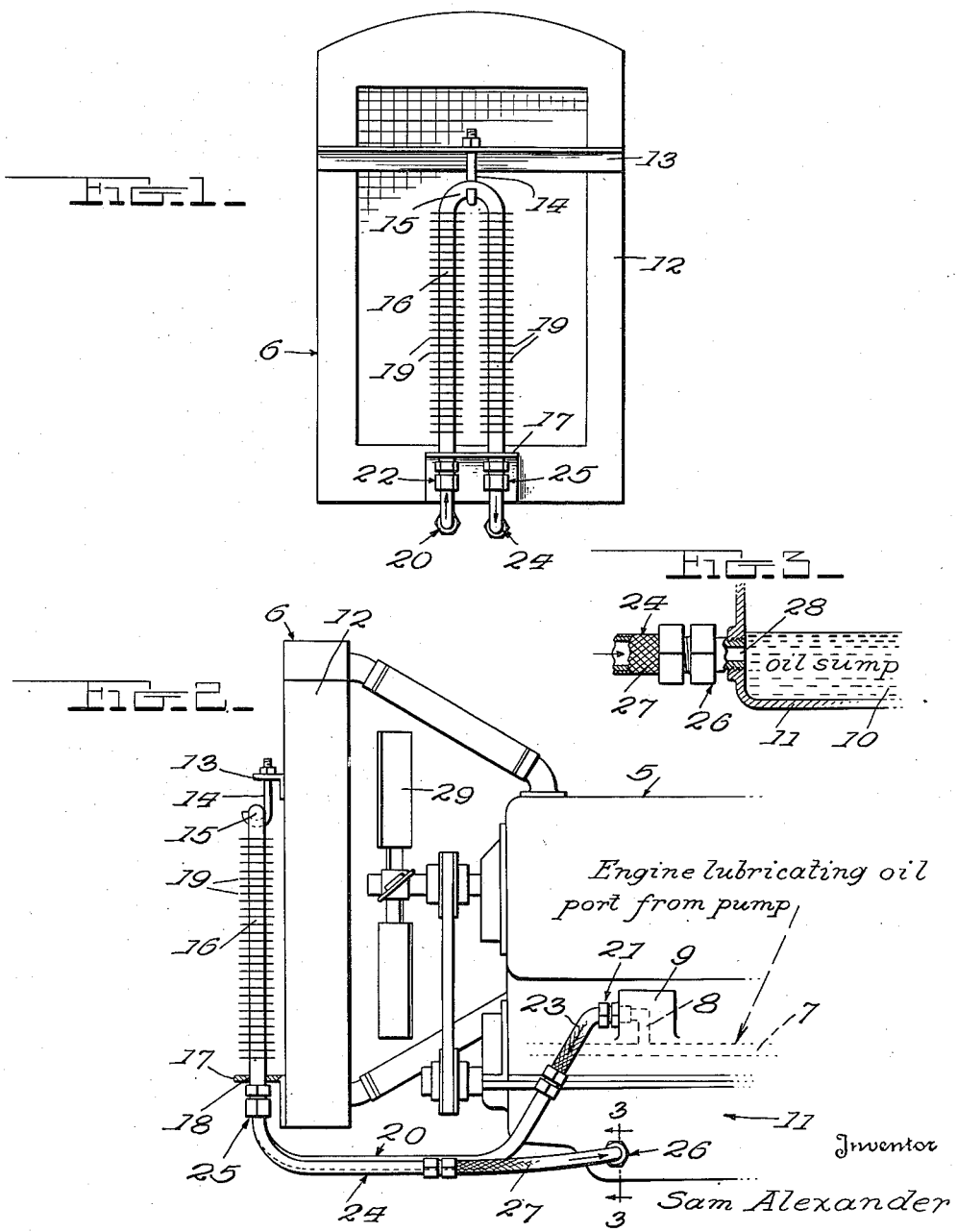
Inventor
Sam Alexander
By D. H. B. Wilson & Co.
Attorney Patented May 22, 1951

2,554,437

UNITED STATES PATENT OFFICE 2,554,437

ENGINE OIL-COOLING MEANS

Sam Alexander, San Antonio, Tex., assignor of one-third to R. L. Kersey, San Antonio, Tex., and one-third to Birkhead, Beckmann, Stanard, Vance & Wood, San Antonio, Tex., a law partnership Application March 31, 1947, Serial No. 738,405

2 Claims. (Cl. 184—104)

The invention aims to make novel provision for cooling the lubricating oil of internal combustion engines, to prevent heat deterioration thereof.

The invention is designed particularly for cooling the oil used in the engines of trucks, tractors, busses, and other automotive machines, although equally advantageous for stationary power plants and, therefore, not restricted to the power plants of mobile machines.

A further object of the invention is to provide a simple and inexpensive oil cooling means which may be expeditiously manufactured and installed, and will be long-lived and trouble-free.

Figure 1 of the accompanying drawing is a front elevation showing the oil cooling radiator mounted in front of the water cooling radiator of a water-cooled internal combustion engine.

Fig. 2 is a side elevation of the engine and its cooling radiator, and the oil cooling means.

Fig. 3 is an enlarged detail section on line 3—3 of Fig. 2.

The construction disclosed will be rather specifically described, but within the scope of the invention as claimed, variations may be made.

An automobile engine 5 is shown having a water jacket connected in the customary way with a water cooling radiator 6. The lubricating system of the engine includes a plurality of ports extending from the conventional oil pump (not shown) and one of these ports is indicated at 7 in Fig. 2. This port may be provided with a branch 8 in a boss 9 on an appropriate part of the engine 5, and is useable to conduct oil from the port 7 to the oil cooling means hereinafter described, the oil being discharged from said cooling means into the usual oil sump 10 of the crank case 11.

The radiator 6 includes the conventional frame 12, and to the upper front portion of this frame, I weld or otherwise secure a horizontal angle metal bar 13 which rigidly supports a J-bolt 14. Upon this J-bolt, I hang the bight 15 of an inverted U-shaped oil cooling tube 16. An angle metal bracket 17 is welded or otherwise secured to the lower portion of the radiator frame 12 and is formed with openings through which the ends of the tube 16 extend, one of said openings being shown at 18 in Fig. 2. The tube 16 is preferably of copper and it is provided with appropriate cooling fins 19. Three-fourth inch copper tubing is preferable for most purposes, although other diameters may of course be used.

An oil conducting line 20 is coupled at 21 to the port branch 8 and is coupled at 22 to one end of the oil cooling radiator or tube 16, and said line 20 preferably includes a flexible section 23 to prevent breakage from vibration.

An oil return line 24 is coupled at 25 to the other end of the tube or radiator 16, and is coupled at 26 to the crank case 11, in communication with the sump 10, and said line 24 preferably includes a flexible section 27 to prevent breakage from vibration. When the tube 16 is of three-fourth inch tubing, the tubing for the lines 20 and 24 is preferably five-sixteenths of an inch, copper being preferable.

Oil under pressure from the engine lubricating system, flows through the line 20 and radiator 16 and is thus cooled, and the relatively cool oil returns through the line 24 to the oil sump 10. The oil conducting means has sufficient resistance to oil flow to prevent it from causing abnormally low oil pressure in the port 7 and other portions of the engine lubricating system. This resistance is preferably obtained by providing the coupling 26 with a passage 28 which is reduced with respect to the diameter of the oil return line 24. A diameter of one-eighth inch for this port 28, is employed when the tubing for the line 24 is five-sixteenths of an inch. Not only does this port prevent the oil cooling means from causing abnormally low pressure in the engine lubricating system, but it insures sufficient dwell of the oil in the radiator 16, to obtain more efficient cooling than if the oil circulation through said radiator were rapid.

By means of the invention, a quantity of the engine lubricating oil is constantly circulating through the oil cooling radiator and thus the temperature of the oil is prevented from rising to a dangerous degree. In this regard, it will be observed that the oil radiator 16 is within the current of air produced by the usual engine-driven fan 29 behind the radiator 12 and is, therefore, very efficient.

From the foregoing, taken in connection with the accompanying drawing, it will be seen that novel and advantageous provision has been made for carrying out the objects of the invention, but attention is again invited to the possibility of making variations within the scope of the invention as claimed.

I claim:

1. In a power plant including an internal combustion engine having an oil sump and a port through which lubricating oil is pumped under pressure, and a cooling system for said engine including a water-cooling radiator and a fan behind said radiator; an oil-cooling means for the engine lubricating oil comprising an inverted U-shaped oil-cooling tube mounted in front of said radiator and having cooling fins, an oil-conducting line from said port to one end of said oil-cooling tube, and an oil-return line from the other end of said oil-cooling tube to said sump, said oil-return line including a coupling connected to said sump and formed with a passage of reduced diameter providing sufficient resistance to oil flow to prevent said oil-cooling means from causing abnormally low pressure in said port, said radiator having a rigidly supported J-bolt upon which the bight of said inverted U-shaped oil-cooling tube is hung, said radiator also having a bracket provided with openings through which the ends of said tube extend.

2. In an oil cooler for an internal combustion engine power plant, the combination of the upright frame of a water cooling radiator, a horizontal angle metal bar secured across the upper portion of said frame and having a centrally positioned vertical opening, a J-bolt in said opening and depending from said bar, an angle metal bracket secured centrally to the lower part of said frame and having an outwardly projecting horizontal flange with spaced openings, an inverted U-shaped oil cooling tube having its bight portion engaged with said J-bolt and the ends of its depending arms extending through the openings in said flange, said arms carrying heat radiating fins, and oil inlet and outlet pipes coupled to the extremities of said depending arms.

SAM ALEXANDER.

REFERENCES CITED

The following references are of record in the file of this patent:

UNITED STATES PATENTS

| Number | Name | Date |
|---|---|---|
| 1,666,485 | Bradford | Apr. 17, 1928 |
| 2,013,708 | Bianchi | Sept. 10, 1935 |
| 2,157,513 | Walden | May 9, 1939 |
| 2,223,262 | Merkle | Nov. 26, 1940 |